(12) United States Patent
Faigle et al.

(10) Patent No.: US 6,412,584 B1
(45) Date of Patent: Jul. 2, 2002

(54) VEHICLE DOOR OPENER

(75) Inventors: Ernst M. Faigle, Dryden; Douglas P. Campbell, Metamora, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/458,218

(22) Filed: Dec. 9, 1999

(51) Int. Cl.⁷ .................................................. E05D 5/10
(52) U.S. Cl. ........................ 180/282; 180/274; 180/281; 89/1.14; 16/254
(58) Field of Search ............................... 180/274, 271, 180/268, 279, 281, 282, 283, 284; 280/735; 307/10.1; 89/1.14; 16/221, 254, 386, 86 C

(56) References Cited

U.S. PATENT DOCUMENTS

| | | | |
|---|---|---|---|
| 2,826,444 A | * 3/1958 | Kurilenko .................... 292/177 |
| 3,359,767 A | * 12/1967 | Arlauskas et al. ............. 70/264 |
| 3,431,998 A | * 3/1969 | Martin ........................ 180/112 |
| 3,468,392 A | 9/1969 | Hass .......................... 180/112 |
| 3,479,767 A | 11/1969 | Gardner et al. ................ 49/280 |
| 3,675,533 A | * 7/1972 | Gawlick et al. .............. 89/1 B |
| 3,694,003 A | 9/1972 | Radke .......................... 280/150 |
| 3,747,379 A | 7/1973 | Cabanes ....................... 70/264 |
| 3,830,332 A | * 8/1974 | Fontaine ....................... 180/113 |
| 4,127,018 A | * 11/1978 | Brand .......................... 70/282 |
| 4,422,521 A | * 12/1983 | Mochida ....................... 180/271 |
| 4,785,907 A | 11/1988 | Aoki et al. ................... 180/274 |
| 4,978,089 A | * 12/1990 | Alquier et al. ............. 244/129.5 |
| 5,327,990 A | 7/1994 | Busquets ...................... 180/271 |
| 5,574,315 A | * 11/1996 | Weber ......................... 307/10.1 |
| 5,727,288 A | * 3/1998 | Byon ........................... 16/254 |
| 5,975,231 A | * 11/1999 | Hirato ......................... 180/274 |
| 5,979,114 A | * 11/1999 | Clark et al. ................... 49/360 |
| 6,056,076 A | * 5/2000 | Bartel et al. ................. 180/167 |
| 6,081,758 A | * 6/2000 | Parvulescu ..................... 701/45 |

\* cited by examiner

*Primary Examiner*—Frank Vanaman
*Assistant Examiner*—J. Allen Shriver
(74) *Attorney, Agent, or Firm*—Tarolli, Sundheim, Covell, Tummino & Szabo L.L.P.

(57) ABSTRACT

A vehicle (10) has an opening (14) for ingress to and egress from a passenger compartment (12) in the vehicle. A door (16) has a closed position blocking the opening (14) and an open position enabling ingress and egress through the opening. A structure (22, 60) assists in maintaining the door (16) in the closed position. An actuatable device (30, 74), when actuated, renders the structure unable to assist in maintaining the door in the closed position.

4 Claims, 1 Drawing Sheet

VEHICLE DOOR OPENER

FIELD OF THE INVENTION

The present invention relates to permitting ingress and egress to a passenger compartment of a vehicle after a crash.

BACKGROUND OF THE INVENTION

Vehicles have openings for ingress and egress of vehicle passengers to and from a passenger compartment in the vehicle. A vehicle door has a closed position blocking such an opening and an open position enabling ingress and egress of passengers to the passenger compartment through the opening. Upon a vehicle crash, it is desirable that the door be easily moved to an open position without tools so that passengers may be rescued from the passenger compartment, if necessary.

SUMMARY OF THE INVENTION

The present invention is an apparatus for use in a vehicle having an opening for ingress to and egress from a passenger compartment in the vehicle. A door has a closed position blocking the opening and an open position enabling ingress and egress through the opening. A structure assists in maintaining the door in the closed position. An actuatable device, when actuated, renders the structure unable to assist in maintaining the door in the closed position.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF A PREFERRED EMBODIMENT

Figure 1:
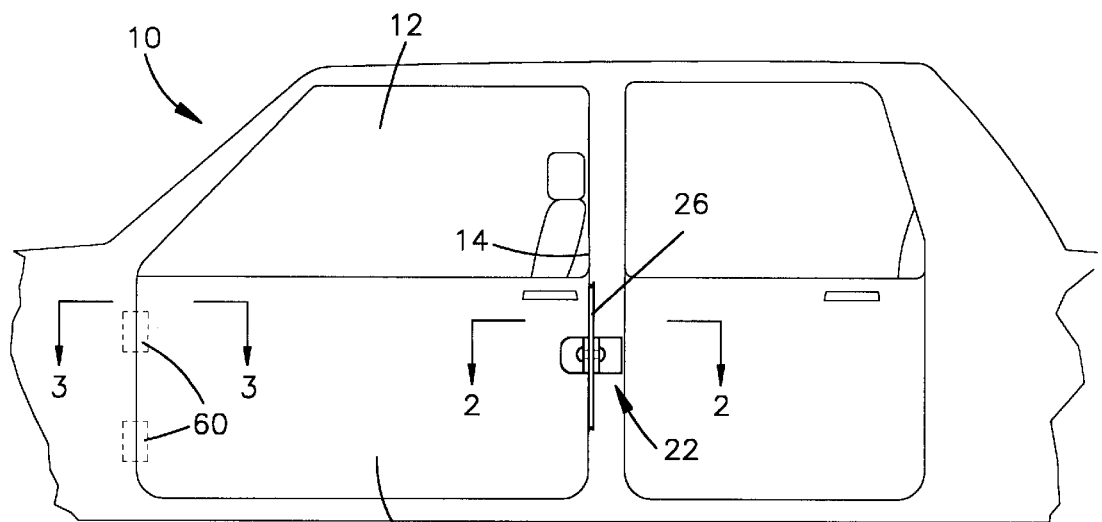
FIG. 1 is a schematic view of a vehicle.

As representative of the present invention, FIG. 1 illustrates schematically a vehicle 10. The vehicle 10 has an opening 14 for ingress and egress of vehicle passengers to a passenger compartment 12. A door 16 has a closed position blocking the opening 14, as shown in FIG. 1. The door 16 also has an open position enabling ingress and egress of vehicle passengers through the opening 14.

Figure 2:
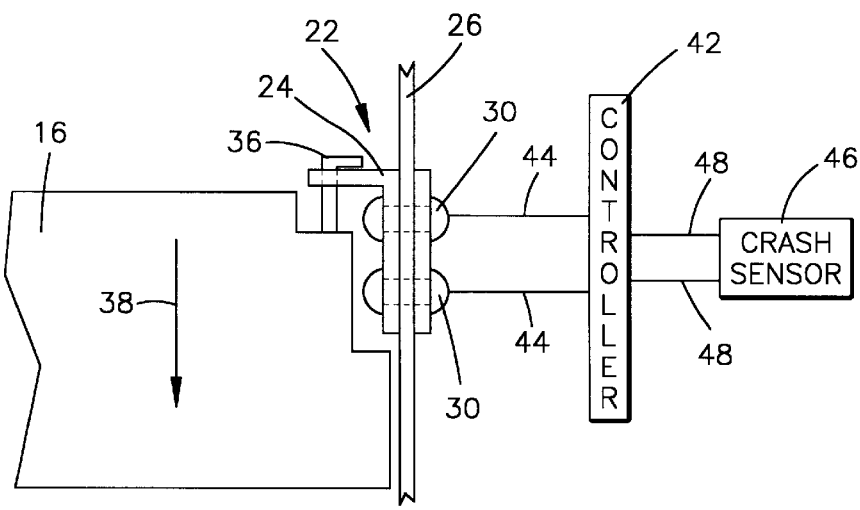
FIG. 2 is a view taken along the line 2—2 in FIG. 1 showing a schematic latch mechanism.

A latch structure or mechanism 22 assists in maintaining the door in the closed position. The latch mechanism 22 may be of any suitable construction and is schematically illustrated in FIG. 2. The latch mechanism 22 (FIG. 2) includes a door latch 24 fixedly connected to a body 26 of the vehicle 10. The doorlatch 24 is connected to the vehicle body 26 by fasteners 30.

The fasteners 30 are actuatable pyrotechnic fasteners, which, when actuated, are destroyed and lose their ability to fix the door latch 24 to the body 26. The fasteners thus disconnect the door latch 24 from the body 26 upon actuation. Alternatively, actuatable pyrotechnic devices could be located adjacent the fasteners 30. When the pyrotechnic devices are actuated, a jet of flame or heat is directed from the pyrotechnic devices toward the fasteners 30 to destroy the fasteners.

A latch pin 36 on the door 16 is received by the door latch 24 to maintain the door 16 in the closed position. When the latch pin 36 is released from the door latch 24, the door 16 can be moved in the direction of arrow 38 from the closed position to an open position. When the door 16 moves from an open position to the closed position, the door latch 24 receives the latch pin 36 and holds the door in the closed position.

A controller 42 sends signals through wires 44 to the fasteners 30 to actuate the fasteners. A crash sensor 46 for sensing a vehicle collision of a predetermined severity sends output signals through wires 48 to the controller 42. The crash sensor 46 provides the output signals in response to sensing a vehicle collision of the predetermined severity.

When the crash sensor 46 senses a vehicle is collision of the predetermined severity, the crash sensor sends signals to the controller 42. The controller 42 sends signals to the fasteners 30 to actuate the fasteners. The fasteners 30, when actuated, are destroyed and disconnect the latch 24 from the body 26, and thus render the latch mechanism 22 unable to assist in maintaining the door 16 in the closed position. The controller 42 actuates the fasteners 30 at least two seconds after the collision.

A pair of hinge structures 60 (FIG. 1) connect the vehicle door 16 to the vehicle body 26 at locations along an edge of the door opposite the latch. The hinges 60 support the vehicle door 16 for pivotal movement between an open position and the closed position. The hinges 60 assist in maintaining the door in the closed position when the latch pin 36 is received by the door latch 24.

Figure 3:
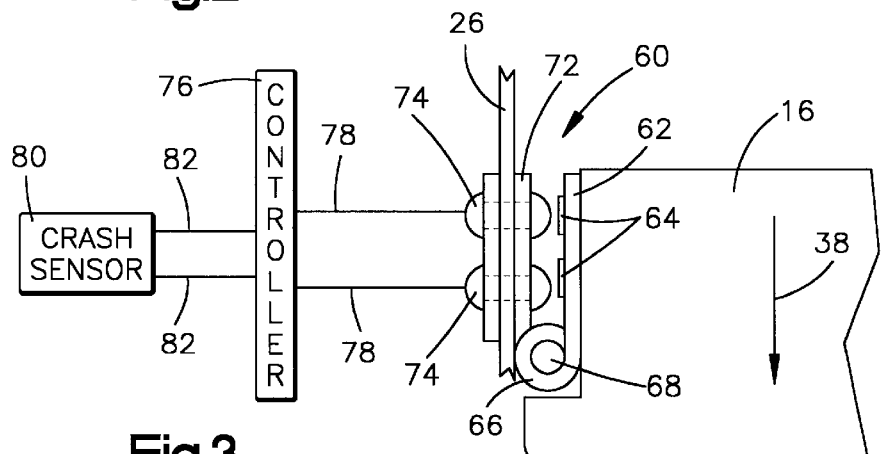
FIG. 3 is a view taken along the line 3—3 of FIG. 1 showing a schematic door hinge.

The hinges 60 may be of any suitable construction and are schematically illustrated in the drawings. The hinges 60 are identical and, therefore, only one hinge will be described in detail. The hinge 60 (FIG. 3) includes a first member 62 fixedly connected to the door 16 by bolts 64. The first member 62 includes a cylindrical portion 66 extending around a hinge pin 68. The door 16 and the first member 62 pivot about the hinge pin 68 when the door moves in the direction indicated by the arrow 38 from the closed position to the open position.

The hinge 60 includes a second member 72 fixedly connected to the body 26 of the vehicle 10. The member 72 includes a cylindrical portion (not shown) which extends around the hinge pin 68. The second member 72 is connected to the vehicle body 26 by fasteners 74.

The fasteners 74 are actuatable pyrotechnic fasteners, which, when actuated, are destroyed and lose their ability to fix the member 72 to the vehicle body 26, and the member 72 becomes disconnected from the body 26. Alternatively, actuatable pyrotechnic devices could be located adjacent the fasteners 74. When the pyrotechnic devices are actuated, a jet of flame or heat is directed toward the fasteners 74 to destroy the fasteners.

A controller 76 sends signals through wires 78 to the fasteners 74 to actuate the fasteners. A crash sensor 80 for sensing a vehicle collision of a predetermined severity sends signals through wires 82 to the controller 76. The crash sensor 80 provides the output signals in response to sensing a vehicle collision of the predetermined severity.

When the crash sensor 80 senses a vehicle collision of the predetermined severity, the crash sensor sends signals to the controller 76. The controller 76 sends signals to the fasteners 74 to actuate the fasteners. The fasteners 74, when actuated, render the hinges 60 unable to assist in maintaining the door 16 in the closed position. The controller 76 actuates the fasteners 74 at least two seconds after the collision.

When the latch 24 is disconnected from the vehicle body 26 and the hinges 60 are disconnected from the body 26, the door 16 can be moved out of position blocking the opening 14 without tools. When the door is moved out of position, passengers in the vehicle can be rescued and taken from the passenger compartment through the opening 14 by rescuers, such as police or emergency medical personnel.

From the above description of the invention, those skilled in the art will perceive improvements, changes and modifications. For example, the controller 42 and crash sensor 46 could actuate fasteners 74 to destroy fasteners 74 as well as actuate fasteners 30 to destroy fasteners 30 rather than the apparatus including a separate controller 76 and crash sensor 80 associated with the fasteners 74. Such improvements, changes and modifications within the skill of the art are intended to be covered by the appended claims.

Having described the invention, the following is claimed:

1. Apparatus comprising:

a vehicle body having an opening for ingress to and egress from a passenger compartment in the vehicle body;

a vehicle door;

at least one hinge connected between said vehicle body and said vehicle door and supporting said door for pivotal movement relative to said vehicle body between a closed position blocking said opening and an open position enabling ingress and egress through said opening;

said hinge comprising a first hinge part fixedly connected to said vehicle body, a second hinge part fixedly connected to said vehicle door, and a hinge pin connected between said first and second hinge parts;

a first pyrotechnic fastener which connects said first hinge part to the vehicle body and which when actuated disconnects said first hinge part and thereby said hinge from the vehicle body;

a latch mechanism having a latched condition maintaining said vehicle door in the closed position and having an unlatched condition enabling said vehicle door to be pivoted from the closed position to the open position;

said latch mechanism comprising a door latch fixed to said vehicle body and a latch pin fixed to said vehicle door and movable with said vehicle door, said latch pin being receivable by said door latch to maintain said vehicle door in the closed position, said latch pin being releasable by said door latch to enable said vehicle door to be moved from the closed position to the open position;

a second pyrotechnic fastener which connects said door latch to the vehicle body and which when actuated disconnects said door latch and thereby said latch mechanism from the vehicle body;

a crash sensor for sensing a vehicle collision of a predetermined severity and providing an output signal in response to such a collision; and a controller for receiving said output signal and actuating said first and second pyrotechnic fasteners;

said latch pin being received by said door latch prior to said crash sensor sensing a vehicle collision to maintain said door in the closed position;

said first pyrotechnic fastener when actuated causing said first hinge part and thereby said hinge to be disconnected from said vehicle body thereby rendering said hinge unable to assist in maintaining said door in the closed position;

said second pyrotechnic fastener when actuated causing said door latch and thereby said latch mechanism to be disconnected from said vehicle body thereby rendering said latch mechanism unable to assist in maintaining said door in the closed position;

said door being removable from said vehicle body without tools to enable ingress and egress from said opening when said hinge and said latch mechanism are disconnected from said vehicle body.

2. Apparatus as set forth in claim 1 wherein said hinge pin of said hinge is not a pyrotechnic device and is not destroyed upon actuation of said first pyrotechnic fastener.

3. Apparatus as set forth in claim 2 wherein said latch pin of said latch mechanism is not a pyrotechnic device and is not destroyed upon actuation of said second pyrotechnic fastener.

4. Apparatus as set forth in claim 1 wherein said controller actuates said first and second pyrotechnic fasteners at least two seconds after the collision.

* * * * *